United States Patent [19]

Hamilton, Jr. et al.

[11] 3,956,209

[45] May 11, 1976

[54] TWO-PART ROOM TEMPERATURE VULCANIZABLE SYSTEMS

[75] Inventors: Stephen B. Hamilton, Jr., Schenectady; Warren R. Lampe, Ballston Lake, both of N.Y.

[73] Assignee: General Electric Company, Waterford, N.Y.

[22] Filed: July 5, 1974

[21] Appl. No.: 486,117

Related U.S. Application Data

[63] Continuation of Ser. No. 387,460, Aug. 9, 1973, Pat. No. 3,839,246.

[52] U.S. Cl. .................... 260/18 S; 260/33.6 SB; 260/37 SB; 260/46.5 G; 260/825
[51] Int. Cl.² .................................... C08L 91/00
[58] Field of Search ........ 260/18 S, 33.6 SB, 37 SB, 260/46.5 G, 825

[56] References Cited
UNITED STATES PATENTS 3,070,566 12/1962 Nitzsche et al. ............... 260/46.5 G
3,839,246 10/1974 Hamilton, Jr. et al. ............ 260/18 S Primary Examiner—Lewis T. Jacobs
Attorney, Agent, or Firm—Donald J. Voss; E. Philip Koltos; Frank L. Neuhauser

[57] ABSTRACT

There is provided by the present invention a two-part room temperature vulcanizable silicon rubber composition which is exceptionally stable to reversion and specifically to reversion of the cured composition caused by water comprising a silanol-stopped diorganopolysiloxane, filler, an alkyl silicate and a catalyst where the catalyst is a reaction product of an organic tin oxide compound with the hydrocarbon ester of an oxygen-containing acid having at least one oxygen atom in the acid radical attached to a replaceable acid hydrogen atom. The hydrocarbon ester can be either an inorganic acid or a carboxylic acid. The preferred catalyst in the present invention is the reaction product of dibutyl tin oxide and a phthalate ester.

5 Claims, No Drawings

TWO-PART ROOM TEMPERATURE VULCANIZABLE SYSTEMS

This application is a continuation of application Ser. No. 387,460, filed August 9, 1973, now U.S. Pat. No. 3,839,246.

BACKGROUND OF THE INVENTION

The present invention relates to a two-part room temperature vulcanizable silicone composition and more specifically the present invention relates to a two-part room temperature vulcanizable silicone rubber composition which in the cured state is extremely hydrolytically stable and has high resistance to reversion.

Two-part room temperature vulcanizable rubber compositions are well known compositions in the prior art. Such compositions generally comprise as ingredients a silanol-stopped diorganopolysiloxane and a filler which comprises one-part of the two-component composition. The second part of the two-component composition usually comprises an alkyl silicate or a partial hydrolysis product of an alkyl silicate as the cross-linking agent combined with a catalyst which traditionally has been the metallic salt of an organic monocarboxylic or dicarboxylic acid in which the metal ion is selected from the class consisting of lead, tin, zirconium, antimony, iron, cadmium, barium, calcium, titanium, bismuth and manganese.

One trouble with this type of catalyst which has been experienced in practice is that the catalyst is not adequately soluble and in most cases is found to be insoluble in the alkyl silicate of the second component. As a result when the two components are mixed together to cure the composition to form a cured two-part room temperature vulcanizable silicone rubber composition, it is found the insoluble catalyst does not readily disperse throughout the entire composition and is only erratically dispersed through the total composition. As a result of the inadequate dispersion, the two-part room temperature vulcanizable silicone rubber composition does not cure uniformly. In fact, there may be experienced weak spots in the cure even after the two-part room temperature vulcanizable silicon rubber composition has been allowed to lie for a substantial period of time so as to allow it to cure. The solution to this problem has been met by, in most cases, urging the applicators of the two-part RTV system (RTV standing for room temperature vulcanizable silicone rubber composition) to mix the two components one into the other very thoroughly. However, as can be envisioned, this is not only time consuming but extremely difficult to carry out in practice.

Another problem with the utilization of the metal salts of a monocarboxylic acid or dicarboxylic acid catalyst is that after the two-part RTV system is cured and especially in warm and humid climates, water vapor or moisture might react with the catalyst which was present in the cured two-part RTV system and result in the liberation of acids which over a period of time will degrade the cured two-part RTV system to some extent. Although the two-part RTV system even if degraded in this manner, will retain most of its physical properties, nevertheless, there resulted the phenomenon of what is known as "chalking", that is, the surface RTV layer would degrade somewhat and present an unsightly appearance to the eye. This reversion or degradation of the RTV system was especially found to be evident when the traditional two-part RTV systems were cured to form roof coatings in humid climates.

Accordingly, it would be highly desirable to provide a catalyst system for a two-part RTV system which catalyst would be easily soluble in the alkyl silicate cross-linking agent in traditional two-part RTV systems as well as the linear silanol-stopped diorganopolysiloxane material and also to provide a catalyst which even in hot and humid climates would not release or degrade to form acids which might attack and cause reversion of the cured two-part RTV system.

Therefore, it is one object of the present invention to provide a novel catalyst for a two-part RTV system which catalyst would be soluble in the other fluids which are utilized to produce the uncured RTV system.

It is an additional object of the present invention to provide a catalyst for a two-part RTV system which catalyst even in hot and humid climates will not release any acids which might degrade the cured RTV polymer.

It is an additional object of the present invention to provide a novel catalyst for two-part RTV systems which can easily be incorporated into a two-part self-bonding RTV system so as to produce from such two-part RTV systems coatings and films of exceptional hydrolytic stability.

These and other objects of the present invention are accomplished in accordance with the disclosure set forth herein below.

SUMMARY OF THE INVENTION

In accordance with the above objects, there is provided by the present invention a two-part room temperature vulcanizable silicone rubber composition with improved hydrolytic resistance and stability comprising (a) a linear fluid organopolysiloxane containing terminal silicon bonded hydroxy groups and having a viscosity of 500 to 10,000,000 centipoise when measured at 25°C, the organic groups of the aforesaid organopolysiloxane representing monovalent hydrocarbon radicals, (b) a filler, (c) from 0.1 to 15% by weight of an alkyl silicate selected from the class consisting of (1) a monomeric organosilicate corresponding to the general formula,

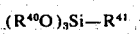
$(R^{40}O)_3Si-R^{41}$ where $R^{40}$ is a radical selected from the class consisting of monovalent hydrocarbon radicals and halogenated monovalent hydrocarbon radicals and $R^{41}$ is selected from the class consisting of alkyl, haloalkyl, aryl, haloaryl, alkenyl, cycloalkyl, cycloalkenyl, cyanoalkyl, alkoxy and acyloxy radicals and (2) a liquid partial hydrolysis product of the aforementioned organosilicate monomeric compounds. The alkyl silicate or the partial hydrolysis product of the alkyl silicate is a cross-linking agent which is kept separate from the linear silanol-stopped diorganopolysiloxane and the filler. Normally, the filler is incorporated into the silanol-stopped diorganopolysiloxane polymer to form component (A) of the two-part system and component (B) comprises the alkyl silicate cross-linking agent or the partial hydrolysis product of this material.

Into component (B) and more specifically mixed in with component (B) there is provided by the present invention the incorporation of a novel catalyst which is a reaction product of an organo tin oxide having the formula R"R'"SnO where R" and R'" are monovalent hydrocarbon radicals; with a hydrocarbon ester of an oxygen containing acid having at least one oxygen atom in the radical attached to a replaceable acid hydrogen atom. Preferably, there is incorporated into the composition, 0.1 to 5% by weight of the linear silanol-terminating organopolysiloxane of this novel catalyst.

As is well known, other ingredients may be mixed into either component (A) or component (B) of the two-part RTV system which agents are normal constituents of two-part RTV systems. The preferred novel catalyst of the present case is the reaction product of dibutyl tin oxide with a phthalate ester. Generally, R" and R'" may be selected from any hydrocarbon radicals but more preferably are selected from alkyl and aryl radicals such as methyl, ethyl or phenyl of up to 12 carbon atoms. The tin oxide is reacted with a hydrocarbon ester of either an inorganic acid or monocarboxylic acid or dicarboxylic acid.

It is desired to produce a self-bonding two-part RTV system having the novel catalyst set forth above, then there may be incorporated into the composition and preferably in component (B) of the composition a self-bonding agent comprising 0.1 to 10% by weight of the diorganopolysiloxane of a nitrogen functional silane of the formula $$\Sigma_{(3-a)}Si\begin{array}{c}R_a\\|\\ \theta\end{array} \quad (1)$$

wherein the nitrogen functionality lies in the theta radical and R is selected from the class consisting of monovalent hydrocarbon radicals and halogenated monovalent hydrocarbon radicals such as alkyl, aryl and halogenated alkyl and aryl radicals, $\Sigma$ is a hydrolyzable group selected from the class consisting of alkoxy, phenoxy and dialkylamino groups, theta is a saturated, unsaturated or aromatic nitrogen functional hydrocarbon residue functionalized by a member selected from the class consisting of amino, cyano, oxo and ester, $a$ is a whole number that varies from 0 to 2 in the foregoing formula.

There is also provided by the present invention a process for producing a two-part RTV system and more particularly a novel process for producing a two-part RTV system where there is incorporated in the mixing of the two-part RTV system in place of the traditional metal salt of a carboxylic acid catalyst, the novel catalyst of the present case as set forth above.

In addition, there is provided by the present invention a process for producing a two-part RTV system which is exceptionally hydrolytically stable as well as one that will self-bond to various surfaces such as metal, wood and masonry surfaces by the use in the process for forming the two-part RTV system in addition to the novel catalyst of the present case, a nitrogen functional silane as set forth in formula (1) above.

DESCRIPTION OF THE PREFERRED EMBODIMENT

As stated previously, the organo tin oxides which are utilized in the present invention to form the reaction product catalyst preferably have the formula, R"R'" SnO where R" and R'" are monovalent hydrocarbon groups selected from the class consisting of alkyl radicals such as methyl, ethyl, propyl, butyl, etc.; mononuclear and binuclear aryl radicals such as phenyl, naphthyl and etc.; aralkyl radicals such as phenylmethyl and etc. Even more preferably the R and R" radicals are selected from alkyl, lower alkyl radicals and mononuclear aryl radicals such as methyl, ethyl and phenyl of up to 8 carbon atoms.

Among the organo tin oxides which are preferred to form the catalyst of the present case are dimethyl tin oxide, diethyl tin oxide, dipropyl tin oxide, dibutyl tin oxide, diamyl tin oxide, didecyl tin oxide, dilauryl tin oxide, dipropenyl tin oxide, diphenyl tin oxide, ditolyl tin oxide, methylethyl tin oxide and phenylbutyl tin oxide.

In the claim language in defining the catalyst of the present case, as well as in the specification, the term "oxygen-containing acid having at least one oxygen atom in an acid radical attached to a replaceable acid hydrogen atom" is used to define organic acids commonly referred to as monocarboxylic acids and dicarboxylic acids and inorganic acids containing at least one oxygen atom in the acid radical attached to a replaceable acid hydrogen atom such as phosphorous acid, phosphoric acid, silicic acid, sulfurous acid, sulfuric acid, arsenious acid, arsenic acid, boric acid, perchloric acid, chlorous acid, periodic acid, iodous acid, iodic acid, chromic acid, hypochloric acid, nitrous acid, nitric acid, selenic acid, selenous acid, tellurous acid, telluric acid, titanic acid, bromous acid, and the like.

The organic tin oxide may be reacted with any hydrocarbon ester which may be either a saturated hydrocarbon ester or an unsaturated hydrocarbon ester. Among the esters of an oxygen-containing acid which is reacted with the tin oxide to produce the desired reaction product catalyst are hydrocarbon esters such as ethyl ortho silicate, triethyl arsenate, n-propyl silicate, di-n-propyl sulfate, tributyl phosphate, n-octyl nitrate, di-n-dodecyl sulfate, tri-o-cresyl phosphate, tri-p-cresyl phosphate, amyl borate, methyl acetate, dimethyl maleate, dimethyl phthalate, ethyl benzoate, diethyl maleate, diethyl phthalate, diethyl m-phthalate, diethyl p-phthalate, butyl butyrate, dibutyl sebacate, dioctyl phthalate, butyl glycol phthalate, n-butyl propionate, ethylene butyrate, ethylene laurate, 2-propenyl butanoate, phenol acetate, phenyl laurate, diphenyl phthalate, phenyl salicylate, β-naphthyl benzoate, and 2-naphthyl lactate. Even more preferred hydrocarbon esters which may be utilized in the present invention to produce the desired catalysts are as follows: methyl acetate, ethyl acetate, n-propyl acetate, isopropyl acetate, butyl acetate, phenol acetate, n-cresyl acetate, methyl propionate, n-butyl propionate, sec-butyl propionate, ethylene propionate, ethyl butyrate, n-propyl butyrate, ethylene butyrate, 2-propenyl butanoate, pentyl butanoate, dimethyl maleate, diethyl maleate, ethyl benzoate, amyl benzoate, β-naphthyl benzoate, dimethyl phthalate, diethyl phthalate, diethyl m-phthalate, diethyl-p-phthalate, butyl glycol phthalate, diphenyl phthalate, dibutyl sebacate, ethylene stearate, ethylene laurate, phenyl laurate, phenyl salicylate, 2-naphthyl lactate. Even more preferred hydrocarbon esters of monocarboxylic acids and dicarboxylic acids are the following hydrocarbon esters for use as reactants with the tin oxides described above producing the desired catalyst of the present case: dimethyl maleate, dimethyl phthalate, monoethyl maleate, monoethyl phthalate, diethyl maleate, diethyl phthalate, dipropyl maleate, dipropyl phthalate, dibutyl maleate, dibutyl phthalate, dilauryl maleate, dilauryl phthalate.

To obtain the reaction product of the present case for use in a two-part RTV system of the present case, the reaction is quite simple which comprises mixing the organo tin oxide and the ester together in an agitator and heating the mixture while it has been continuously agitated during a period of about 1 hour or more. During the initial stage of heating, the mixture tends to solidify and form a stiff viscous mass which as the reaction progresses changes into a liquid state as more of the catalyst reaction product is formed. When the reaction is completed, a substantially clear liquid product is obtained.

The organo tin oxide and hydrocarbon ester are preferably reacted in equal molar quantities although a molar quantity of the ester may be reacted with several moles of the organo tin oxide, for example, one mole of diethyl phthalate or ethyl orthosilicate can be reacted with 1, 2 or 4 moles of organo tin oxide. In addition, one mole of tri-cresyl phosphate can be reacted with as many as 6 moles of the organo tin oxide. The reaction may be carried out at various temperatures anywhere from room temperature up to above 250°C. Preferably, a temperature of from 100° to 225°C is desired because the reaction is completed in the specified time period of 1 hour at this temperature range. In addition, for any particular mixture of an ester of an oxygen-containing acid as defined above and an organo tin oxide as defined above, the satisfactory reaction temperature range is the temperature at which the mixture sets up to form a stiff viscous mass. In addition, it may be desired to increase the temperature at 5° above this temperature in order to have the reaction proceed more rapidly. As can be envisioned, the higher the temperature is within the above preferred range of 100° to 225° C, the faster the reaction will proceed to produce the desired reaction product. For example, when an equal molar mixture of a diethyl phthalate and dibutyl tin oxide is agitated and heated to a temperature of 150°C, the slurry formed to a stiff viscous mass which is maintained at this temperature chemically reacts to form a clear-like yellow reaction product, the reaction being completed after a reaction period of about 1 hour as shown by the fact that the viscous mass turns into a clear light yellow liquid product. The liquid reaction product catalyst of the present case that is obtained in accordance with the above disclosure is very soluble in many organic solvents and particularly volatile organic solvents such as ethers, acetones, the chlorinated solvents, xylene, toluene, benzene and etc. The solubility indicated that the product was not merely a solution of the organo tin oxide in the hydrocarbon ester since organo tin oxide is highly insoluble in such organic solvents such as the ones specified above. One of the outstanding advantages of the reaction product catalyst of the present case as defined above, is its very high solubility in alkyl silicates and hydrolysis products of alkyl silicates which is the cross-linking agent in two-part RTV systems and also its high solubility in silanol diorganopolysiloxane gums or fluids. Accordingly, one of the outstanding advantages of the reaction product catalyst of the present case which is prepared as specified above is that it will easily dissolve and be dispersed in the traditional two-part RTV system, thus, enabling the two-part RTV system to cure uniformly after the two components of the system have been mixed. For further information as to the forming of the novel reaction product catalyst of the present case, one is referred to the disclosure of U.S. Pat. No. 2,597,920, whose disclosure is incorporated into the present specification by reference.

In addition, nitrogen functional silanes within the scope of those compounds indicated for formula (1) are those having the formula,

  (2)

where $R^1$ is selected from the class consisting of monovalent hydrocarbon radicals and halogenated monovalent hydrocarbon radicals of up to 10 carbon atoms, and preferably $R^1$ is selected from alkyl radicals of 1 to 5 carbon atoms. In addition, it is preferred that although the $a$ may vary from 0 to 2, that $a$ have a value of 0.

The filler that may be used in the present composition is highly reinforcing filler and semi-reinforcing filler selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton and synthetic fibers. The preferred fillers for the present application are, of course, fumed silica and precipitated silica and particularly fumed silica or precipitated silica that has been treated with various types of siloxane compositions.

The preferred linear fluid organopolysiloxane containing terminal silicon-bonded hydroxy groups and having a viscosity of 500 to 10,000,000 centipoise when measured at 25°C, has preferably the formula,

  (3)

where $R^{42}$ is selected from monovalent hydrocarbon radicals and halogenated monovalent hydrocarbon radicals and $r$ is a whole number that varies from 250 to 7,275.

The organosilicate cross-linking agent has the general formula,

  (4)

where $R^{40}$ is a radical selected from the class consisting of monovalent hydrocarbon radicals and halogenated monovalent hydrocarbon radicals, and $R^{41}$ is selected from the class consisting of alkyl, haloalkyl, aryl, haloaryl, alkenyl, cycloalkyl, cycloalkenyl, cyanoalkyl, alkoxy and acyloxy radicals and it may also comprise a liquid partial hydrolysis product of the aforementioned organosilicate monomeric compound of formula (4).

The radicals R, $R^1$, and $R^{42}$ are preferably selected from the class consisting of alkyl radicals such as methyl, ethyl, propyl, butyl, hexyl, etc.; aryl radicals such as phenyl, diphenyl, metnyl and etc.; alkenyl radicals such as tolyl, xylyl, ethylphenyl and etc.; aralkyl radicals such as benzyl, phenyl, ethyl, and etc.; haloaryl and haloalkyl such as chlorophenyl, tetrachlorophenyl, difluorophenyl and alkenyl radicals such as vinyl, allyl, etc. Further, $R^{42}$ may also represent cyanoalkyl, cycloalkyl and cycloalkenyl radicals. The $R^{42}$ groups attached to a single silicon radical may be the same groups or different groups. It has been found that at least 50% and preferably 70 to 100% of the $R^{42}$ groups in the diorganopolysiloxane molecule should be methyl. Further, the diorganopolysiloxane can be a homopolymer or a copolymer such as, for example, it has different types of units in the chain such as dimethyl, diphenyl, methyl-phenyl, etc.

The organopolysiloxanes of formula (3) may also be represented by the average unit formula, $$R^{42}_m SiO_{4-m/2} \tag{5}$$

where $R^{42}$ is defined above and the value of m may vary from 1.99 to 2. The average unit formula includes organopolysiloxanes having terminal groups other than hydroxy such as monofunctional and trifunctional terminal groups. However, in the present case, it is preferred that the terminal groups be hydroxy and the monofunctional and trifunctional groups be kept to a minimum.

Preparation of the diorganopolysiloxanes of formulas (3) and (5) may be carried out by any of the procedures well known to those skilled in the art. Such polysiloxanes can be produced by following a procedure involving hydrolysis of one or more hydrocarbon substituted dichlorosilanes in which the substituents consist of saturated or unsaturated hydrocarbon groups to produce a crude hydrolyzate containing a mixture of linear and cyclic polysiloxanes. The crude hydrolyzate is then treated with a suitable catalyst such as KOH so that it can be depolymerized to form a mixture of low boiling, low molecular weight cyclic polymers and undesirable materials such as the monofunctional trifunctional chlorosilane starting material. The resulting composition is fractionally distilled and there is obtained a pure product containing the low boiling, low molecular weight cyclic polymers free of any significant amount of monofunctional and trifunctional groups.

In order to depolymerize the crude hydrolyzate, there is added to said hydrolyzate, KOH and a diphenyl solvent and the mixture is heated at a temperature in the range of 150°C to 175°C under an absolute pressure of 100 mm of Hg. to produce and remove by evaporation a product consisting of low molecular weight cyclic polysiloxanes comprising, for example, about 85 percent of the tetramer and 15 percent of the mixed trimer and pentamer. Among the cyclic polymers that may so be produced are hexamethylcyclotrisiloxane, octamethylcyclotetrasiloxane and cimethylcyclopentasiloxane. There also may be formed mixtures of cyclopolysiloxanes such as a mixture of octamethylcyclotetrasiloxane and ethylmethylcyclotetrasiloxane, and mixtures of cyclic polymers of dimethylsiloxane with cyclic polymers of diphenylsiloxane, cyclicmethylphenylsiloxanes and cyclicmethylvinylsiloxanes.

The pure cyclic polysiloxanes are mixed in the desired proportions to obtain the above defined mixture. Then the mixture of the cyclic polysiloxanes are subjected to an equilibration procedure to obtain the diorganopolysiloxane of formula (3). The equilibration is preferably carried out at temperatures of about 125°C to 150°C in the presence of a small amount of rearrangement catalyst such as potassium hydroxide, tetrabutyl phosphonium hydroxide, etc. The amount of catalyst used will depend on the extent of the polymerization desired. Generally, 5–10 ppm (parts per million) of the catalyst is sufficient for the polymerization to produce diorganopolysiloxane polymers of a viscosity of $5.0 \times 10^5$ to $1.0 \times 10^7$ centipoise measured at 25°C. There is also present in the reaction mixture 15–150 ppm (parts per million) of water based on the cyclic polymer so as to supply the hydroxy groups which function as chain-stoppers for the linear diorganopolysiloxane material that is formed. After the equilibration reaction has proceeded for two hours there is reached an equilibration point wherein the mixture contains about 85% linear polymers and the amount of linear polymers being formed from the cyclic polymers is equal to the cyclic polymers being formed from the linear polymers.

When this equilibration point has been reached there is added to the mixture a sufficient amount of an acid donor that will neutralize the KOH catalyst so as to terminate the polymerization reaction. Preferably, 1.7 parts per million of tris-(2-chloroethylphosphite) are added to the reaction mixture to liberate HCl which reacts with and neutralizes the KOH and so terminates the equilibration reaction. The cyclicdiorganosiloxanes in the reaction mixture are then distilled off to leave the polydiorganosiloxane gum which is useful in the present invention. The resulting linear diorganopolysiloxanes are chain-stopped primarily with hydroxy groups and have a viscosity of $5 \times 10^5$ to $1.0 \times 10^7$ centipoise at 25°C. Further, the number of diorgano substituent groups in the siloxane chain is at least 2,150.

High molecular weight diorganopolysiloxanes having a viscosity of $5 \times 10^5$ centipoise at 25°C and above can be treated with water to arrive at low molecular weight diorganopolysiloxanes having a viscosity of $500 \times 5 \times 10^5$ centipoise at 25°C. This may be accomplished by blowing steam across the surface of the high molecular weight product or through the polymer for a sufficient length of time to obtain the low molecular weight component having the desired silanol content. Thus, it is desirable to obtain the low molecular weight diorganopolysiloxane of formula (4) from a portion of the high molecular weight diorganopolysiloxanes by the above water treatment well known to those skilled in the art so as to reduce the number of diorganosiloxy units from above 7,275 to a value of 250 to 2,150. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150°C to 170°C so as to break up the long chain polymers into smaller chains. The amount of water used will vary depending upon such factors as the molecular weight of the polymer being treated, the time and the temperature at which the mixture of high molecular weight diorganopolysiloxanes are heated and the desired viscosity. These conditions may readily be determined, for example, a high molecular weight diorganopolysiloxane having a viscosity of 2,000,000 centipoise at 25°C may be heated to 150°C with 0.5 percent by weight of water for 2 hours to arrive at a low molecular weight organopolysiloxane of formula (4) having a viscosity of 2,000 centipoise. Preferably, the low molecular weight organopolysiloxane is produced so that it has a viscosity of 2,000 to 3,000 centipoise at 25°C.

In order for the diorganopolysiloxane fluids to cure there must be present in the composition the crosslinking agent of formula (4). In that formula, $R^{40}$ groups may be alkyl radicals such as methyl, ethyl, propyl, isopropyl, butyl, amyl, isoamyl, octyl, isooctyl, decyl, dodecyl; haloalkyl such as the chlorinated, brominated, fluorinated alkyl radicals. In addition, $R^{40}$ may represent aryl, aralkyl and alkenyl radicals such as vinyl, allyl, phenyl, tolyl, xylyl, benzyl, phenylethyl, naphthyl, anthracyl, biphenyl, as well as the halogen-substituted derivatives of the above radicals. In addition, $R^{40}$ may represent cycloalkenyl, cycloalkyl and cyanoalkyl radicals. The radical $R^{41}$ represents the same radicals as $R^{40}$ and, in addition, preferably represents alkoxy and aryloxy radicals such as methoxy, ethoxy, butoxy and phenoxy.

In addition to the monomeric organosilicates of formula (4), there is also preferably used as a cross-linking agent, liquid partially hydrolyzed products of the monomeric silicates. Such hydrolysis products are obtained by effecting partial hydrolysis in water of the particular monomeric organosilicate in the presence of small amounts of acid to a point where it is still water-insoluble and still possible to isolate a liquid partially hydrolyzed organosilicon compound. Thus, the ethyl silicate having the formula $(C_2H_5O)_4Si$ may be partially hydrolyzed by adding acids or acid-forming metal salts to the liquid monomeric organosilicate such as $FeCl_3$, $CuCl_2$, $AlCl_3$, $SnCl_4$ and thereafter effecting suitable hydrolysis of this mixture of ingredients in water to obtain the two-phase composition from which the water-insoluble, partially hydrolyzed organosilicate can readily be separated from the aqueous phase and catalyst. The partially hydrolyzed ethyl silicate is sold under the tradename Ethyl Silicate-40, by Union Carbide Corporation.

Generally, there is added from 0.1 to 15.0% by weight of the cross-linking agent of formula (4) and preferably 0.1 to 10% by weight based on the weight of the diorganopolysiloxane of formula (3). If more than 15.0% by weight of cross-linking agent is used, the excess does not function as a cross-linking agent since the initial hydroxy positions on the organopolysiloxane are already reacted with the cross-linking agent and the excess acts as a filler which reduces the elasticity of the cured silicone rubber composition. If less than 0.1% by weight of cross-linking agent is used, there is not sufficient cross-linking agent to react with the organopolysiloxane to form the cured silicone rubber.

Although the preferable cross-linking agents are organosilicates, there may also be used as cross-linking agents organopolysiloxane resins having a functionality greater than 2 and preferably greater than 2.5. The organopolysiloxane resins are methylsiloxanes, or resins which contain both monomethyl and dimethyl or monophenyl units. There may also be used ethylsiloxane resins in which the ratio R"Si is 1.4 to 1 and which mixture contains 15% of butoxy groups or there may be used resins in whcih the ratio R"Si is 1.1 to 1 and which contain 10% of methoxy groups or there may be used methylphenylsiloxane resins containing 50% of monomethyl units, 25% of dimethyl units and 25% of monophenyl units.

Other suitable cross-linking agents are organohydrogenpolysiloxanes of the formula,

(6)

in which $R^{43}$ is an alkyl or aryl radical and $a$ is a number less than 2, but is not zero. The organohydrogenpolysiloxane cross-linking agents have the disadvantage that during curing there is evolved hydrogen gas which can result in bubbles being trapped in the silicone rubber composition. Although the above cross-linking agents can be used in the compositions, the organosilicates of formula (1) are preferred since the processability of the composition is facilitated and the cured silicone rubber composition has better physical properties. A more detailed description of these other cross-linking agents is to be found in Nitzsche et al, U.S. Pat. No. 3,127,363.

There is incorporated into the organopolysiloxane fluid of formulas (3) and (5), a filler which may be of the reinforcing filler type or of the semi-reinforcing type. Generally, the reinforcing fillers have 100-300 square meter surface areas per gram while the semi-reinforcing fillers have a surface area of 1-20 square meters per gram.

The reinforcing fillers are added when it is desired to have a high strength silicone rubber composition, that is, a composition with high values for tensile strength and percent elongation. Illustrative of the many fillers which can be employed are titanium dioxide, lithopone, zinc oxide, zirconium silicate, silica aerogel, iron oxide, diatomaceous earth, calcium carbonate fumed silica, precipitated silica, glass fibers, magnesium oxide, chromium oxide, zirconium oxide, aluminum oxide, crushed quartz, calcined clay, asbestos, carbon, graphite, cork, cotton and synthetic fibers. There can also be used slicca filler treated with an organo cyclic trimer or tetramer such that the filler is hydrophobic. Generally, there can be added to said diorganopolysiloxane of formulas (3) and/or (5), 5 to 300% by weight of filler and preferably 10-200% by weight.

Generally, 0.1 to 5% by weight of the reaction product of the present case is used based on the weight of the diorganopolysiloxane.

As stated previously, there can be utilized in the two-part RTV system of the present case having therein the novel catalyst reaction product, a self-bonding additive of the formulas (1) and (4). It should be understood that these self-bonding additives do not form the basic invention in the present case but are the subject of the copending docket of Warren R. Lampe and Stanley J. Bessmer, Ser. No. 180,068, filed on Sept. 13, 1971 now abandoned, whose disclosure is hereby incorporated into the present specification by reference. The basic invention in the present case has used the novel reaction product catalyst of the present case in a two-part RTV system. In an alternate and preferred embodiment of the preesent case, the self-bonding additives of formulas (1) and (4) may be incorporated into the said two-part RTV system of the present case such that resulting composition have increased hydrolytic resistance and self-bonding capabilities.

One specific nitrogen functional silane coming within the scope of formula (4) above is compounds having the formula,

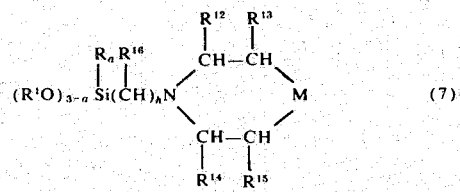

(7)

wherein R and $R^1$ are selected from the class consisting of monovalent hydrocarbon radicals and halogenated monovalent hydrocarbon radicals and preferably may be selected from the various types of radicals disclosed above for the $R^{42}$ radical. Preferably, R and $R^1$ are selected from alkyl and aryl radicals of 10 carbon atoms or less and preferably have 1 to 5 carbon atoms. The radicals $R^{12}$, $R^{13}$, $R^{14}$, $R^{15}$ and $R^{16}$ in formula (7) above are selected from the class consisting of hydrogen, alkyl radicals and aryl radicals of up to 10 carbon atoms, M is selected from the class consisting of $SO_2$ and $C=O$, h is a whole number that varies from 3 to 20 and as pointed out previously a is a whole number that varies from 0 to 2.

Compounds falling within the scope of formula (7) above which are preferred in the present invention for particularly being suited to providing desirable bonding properties for the resulting composition are as follows:

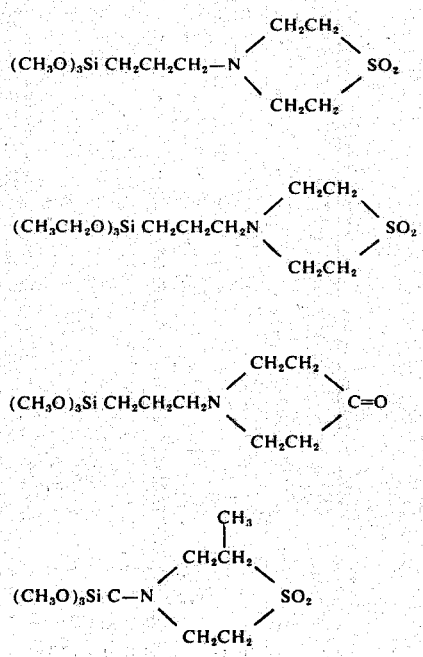

Another class of compounds coming within the scope of formula (4) above have the formula,

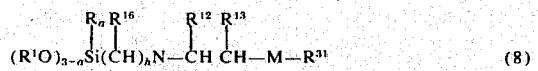

(8)

where R and $R^1$ are as previously defined, $R^{31}$ is selected from the class consisting of monovalent hydrocarbon radicals and halogenated monovalent hydrocarbon radicals, $R^{16}$, $R^{12}$ and $R^{13}$ are selected from the class consisting of hydrogen, alkyl radicals and aryl radicals of up to 10 carbon atoms, M is as previously defined, h is a whole number that varies from 3 to 20 and a is a whole number that varies from 0 to 2.

Compounds coming within the scope of formula (8) and which are preferred in the present application are as follows:

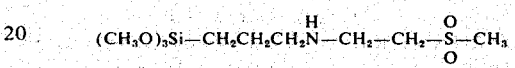

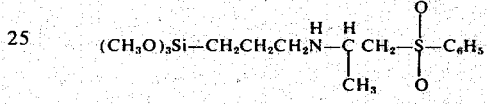

Another group of nitrogen functional silanes coming within the scope of formula (4) above have the general formula,

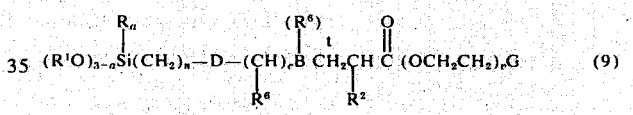

(9)

where R and $R^1$ are as previously defined, $R^2$ and $R^6$ are selected from the class consisting of hydrogen, alkyl and aryl radicals of up to 10 carbon atoms, B is selected from the class consisting of nitrogen, sulfur and oxygen, G is selected from the class consisting of

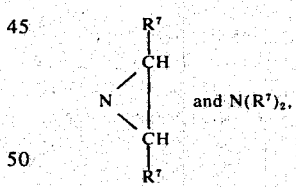

and $N(R^7)_2$, where $R^7$ is selected from the class consisting of hydrogen, alkyl radicals and aryl radicals of up to 10 carbon atoms, c and n are whole numbers that vary from 1 to 10, D is selected from the class consisting of

and oxygen, t is a whole number that varies from 0 to 1, v is a whole number that varies from 1 to 5 and a is a whole number that varies from 0 to 2, as previously stated.

Preferable compounds in the present case which come within the scope of formula (9) above are as follows:

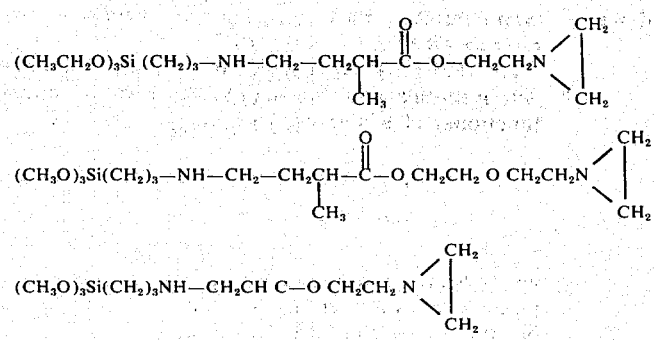

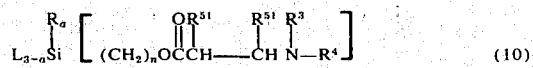

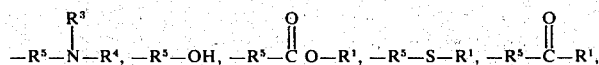

Another group of compounds, i.e., nitrogen functional silanes coming within the scope of formula (4) above are of the formula, $$L_{3-a}Si^{R_a}\left[(CH_2)_n O\overset{O}{\overset{\|}{C}}CH\overset{OR^{51}}{\underset{}{|}}\overset{R^{51}}{\underset{}{-}}\overset{R^3}{\underset{}{CH}}\overset{}{\underset{}{N}}-R^4\right] \quad (10)$$

where L is selected from the group consisting of $R_2^1N-$, and $R^1O-$, R and $R^1$ are as previously defined, $R^{51}$ is selected from the class consisting of alkyl and aryl radicals of up to 10 carbon atoms, $R^3$ and $R^4$ are independently selected from the class consisting of hydrogen, aryl radicals, alkyl radicals $$-R^5-\underset{R^3}{\overset{|}{N}}-R^4, \;-R^5-OH, \;-R^5-\overset{O}{\overset{\|}{C}}O-R^1, \;-R^5-S-R^1, \;-R^5-\overset{O}{\overset{\|}{C}}-R^1,$$

$-R^5-CN$ and $-R^5-OR^1$, where $R^5$ is a divalent hydrocarbon radical selected from the class consisting of alkylene and arylene radicals of up to 10 carbon atoms, $n$ is a whole number that varies from 1 to 20 and $a$ is a whole number that varies from 0 to 2.

Compounds coming within the scope of formula (10) which are preferred in the present composition are as follows:

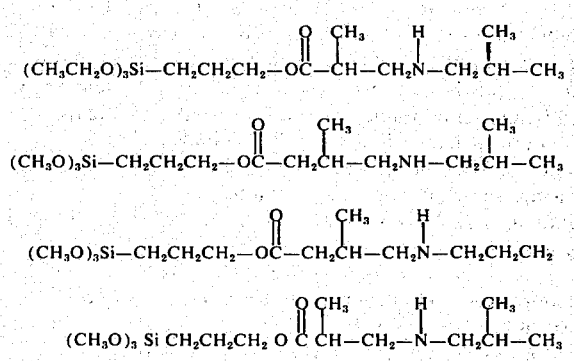

Another class of nitrogen functional silanes which are within the scope of formula (4), are compounds of the formula,

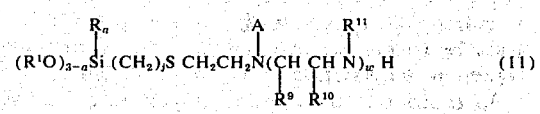

where R and $R^1$ are as previously defined, $R^9$, $R^{10}$ and $R^{11}$ are selected from the class consisting of hydrogen, alkyl radicals and aryl radicals of up to 10 carbon atoms, $j$ is a whole number that varies from 2 to 20, $w$ is a whole number that varies from 1 to 500, A is selected from the class consisting of hydrogen, alkyl radicals, aryl radicals and

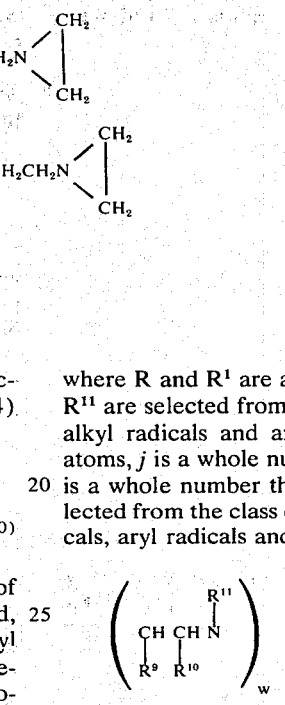

H and $a$ is a whole number that varies from 0 to 2, as previously disclosed.

Compounds which are preferred in the present application and which come within the scope of formula (11) above, are as follows:

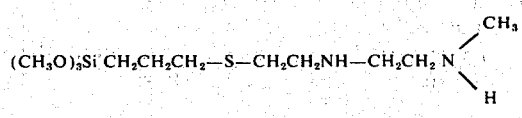

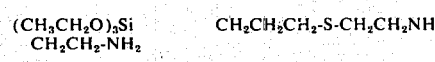

Another nitrogen functional silane coming within the scope of formula (4) above is the nitrogen functional silane of the formula,

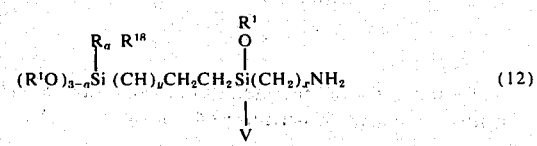

where R and $R^1$ are as previously defined, $R^{18}$ is selected from the class consisting of hydrogen, alkyl radicals and aryl radicals, V is selected from the class consisting of R and $R^1O-$, $y$ is a whole number that varies from 0 to 20, $x$ is a whole number that varies from 2 to 20, and $a$ varies from 0 to 2, as previously stated.

Preferable compounds in the present composition which come within the scope of formula (12) above, are as follows:

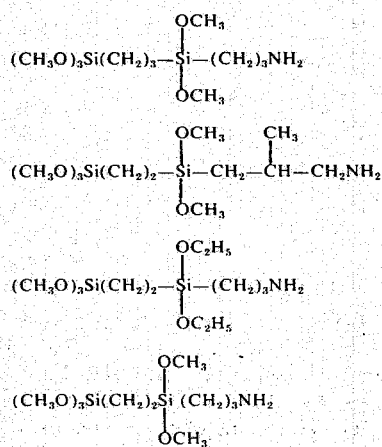

Another class of nitrogen functional silanes coming within the scope of formula (4) above, are those of the formula,

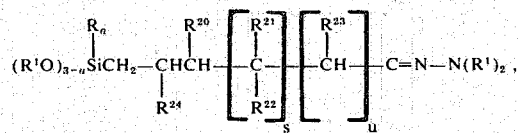

where R and $R^1$ are as previously defined, $R^{20}$, $R^{21}$, $R^{22}$, $R^{23}$ and $R^{24}$ are independently selected from the class consisting of hydrogen, alkyl radicals, cycloalkyl radicals and aryl radicals of up to 10 carbon atoms, $s$ is a whole number that varies from 0 to 1, $u$ is a whole number that varies from 0 to 20, and $a$ is a whole number that varies from 0 to 2.

The preferred compounds coming within the scope of formula (13) above are as follows:

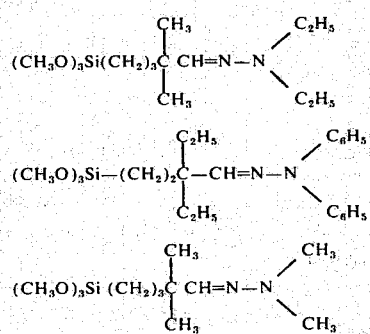

Another class of nitrogen functional silanes coming within the scope of formula (4) above are of the formula,

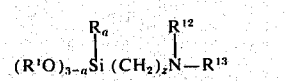

where R and $R^1$ are as previously defined, $R^{12}$ and $R^{13}$ are independently selected from hydrogen, alkyl radicals and aryl radicals of up to 10 carbon atoms, $z$ is a whole number that varies from 2 to 20 and $a$ is a whole number that varies from 0 to 2.

Another group of nitrogen functional silanes coming within the scope of formula (4) above are the nitrogen functional silanes of the formula,

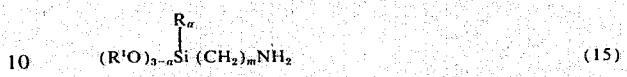

where R and $R^1$ are as defined previously, $m$ is a whole number that varies from 2 to 20 and $a$ is a whole number that varies from 0 to 2.

Another class of nitrogen functional silanes coming within the scope of formula (2) above, are nitrogen functional silanes of the formula,

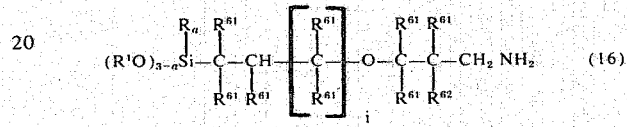

where R and $R^1$ are as previously defined, $R^{61}$ is a radical selected from the class consisting of alkyl radicals, cycloalkyl radicals and where two $R^{61}$ radicals attached to the same carbon atom taken together with the carbon atom to which they are attached may form a cycloalkyl radical having 5 to 7 carbon atoms, $R^{62}$ is a lower alkyl radical such as methyl, ethyl, propyl, $i$ is a whole number that varies from 1 to 4 and $a$ is a whole number that varies from 0 to 2.

An additional class of nitrogen functional silanes coming within the scope of the nitrogen functional silanes of formula (4) above are the nitrogen functional silanes of the formula,

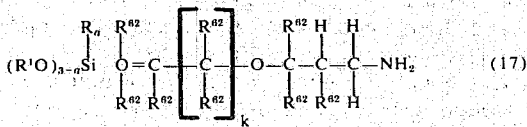

where R and $R^1$ are as defined previously, $R^{62}$ is independently selected from the class consisting of hydrogen, lower alkyl radicals, cycloalkyl radicals containing up to 7 carbon atoms, mononuclear and binuclear aryl radicals, mononuclear aryl lower alkyl radicals and further radicals whose two $R^{62}$ radicals attached to the same carbon atom, taken together with the carbon atoms to which they are attached form a cycloalkyl radical, $k$ is a whole number that varies from 1 to 9 and $a$ is a whole number that varies from 0 to 2.

The above compounds are preferred in the present composition. However, in the case of the compounds of formula (17), as well as of other compounds coming within the other sub-generic formulas disclosed above, any compound coming within the scope of these formulas can be used as a self-bonding additive that may be added to two-package room temperature vulcanizable silicone rubber compositions disclosed in the present application, both for the purpose of improving self-bonding properties as well as for the purpose of being used by themselves or in addition with other catalytic agents in the function of acting as catalytic agents.

In addition to the above nitrogen functional silanes there is disclosed by the present case, nitrogen functional silanes coming within the scope of formula (4) above which have the formula,

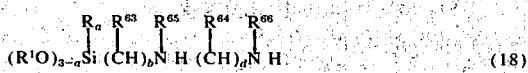

where R and $R^1$ are as defined previously, $R^{63}$, $R^{64}$, $R^{65}$ and $R^{66}$ are independently selected from the class consisting of hydrogen, alkyl radicals and aryl radicals of up to 10 carbon atoms, $b$ is a whole number that varies from 2 to 10, $d$ is a whole number that varies from 2 to 10 and $a$ is a whole number that varies from 0 to 2.

Another sub-generic class of nitrogen functional silanes coming within the scope of formula (4) above are those silanes having the formula,

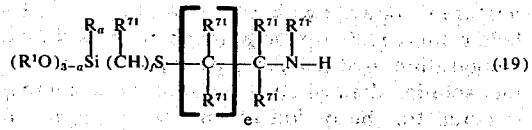

where R and $R^1$ are as previously defined, $R^{71}$ is independently selected from the class consisting of hydrogen, alkyl radicals, and aryl radicals of up to 10 carbon atoms, $e$ is a whole number that varies from 1 to 10, $f$ is a whole number that varies from 2 to 10, and $a$ is a whole number that varies from 0 to 2, as previously disclosed.

Compounds coming within the scope of formula (19) above which are more preferred in the present application are those disclosed above. However, as previously stated any of the compounds disclosed in the sub-generic formula (10) will function in the present application as self-bonding additives as has been discussed previously.

As another example of a sub-generic class of nitrogen functional silanes which come within the scope of formula (4) above and which are preferred in the application of the present case, it is intended to describe and claim in the present application the nitrogen functions silanes of the formula,

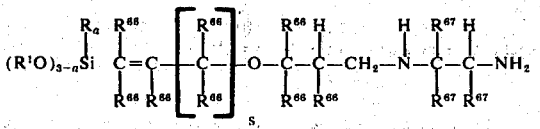

where R and $R^1$ are as previously defined, $R^{66}$ and $R^{67}$ are independently selected from hydrogen, alkyl radicals, aryl radicals, cycloalkyl radicals containing 5 to 7 carbon atoms, mononuclear and binuclear aryl radicals, mononuclear aryl lower alkyl radicals and further radicals where two $R^{66}$ or $R^{67}$ radicals attached to the same carbon atom, taken together with the carbon atom to which they are attached form a cycloalkyl radical and in which the different $R^{86}$ and $R^{67}$ radicals may be all the same or different, $s$ is a whole number that varies from 1 to 4, and $a$ is a whole number that varies from 0 to 2.

In applying the components that are present in the room temperature vulcanizable composition of the present case, the linear diorganopolysiloxane is mixed with filler and color pigments and then stored separately. A second mixture is then composed of the alkyl silicate, with or without a solvent such as xylene the novel reaction product catalyst, and the aminofunctional silane. As a result of the above, there are two mixtures formed — one the base polymer which is stored separately and the other the curing catalyst system which is stored separately. When it is desired to produce the cured room temperature vulcanizable composition, the base polymer is mixed with a curing catalyst mixture and the material is spread, rolled, molded or applied in one manner or another to the desired application. It should be noted that as these two components are mixed together there is approximately 10 minutes work time available to mix the two components together and to mold the resulting mixture into the desired surface. Within 20 to 30 minutes after the initial mixture of the components is carried out at ambient temperature the materials have achieved a sufficient degree of cure (Shore A Hardness 15) to be assumed a definite form. After 1 hour, the silicone rubber composition cures to approximately 80% of the final Shore A Hardness. After 6 hours very little additional change of Hardness occurs. Preferably, the mixture of the base polymer and the curing agent composition is allowed to cure for 24 hours in whatever application it is put to so that it develops its full properties as a room temperature vulcanizable silicone composition. The resulting two-package room temperature vulcanizable silicone rubber composition may be used to form various types of silicone rubber materials. Such a composition may also be used to form laminated coatings for various applications such as for coating cloth or for coating roofs.

In the case where the room temperature vulcanizable silicone rubber composition is to be used for coating roofs, then it is desirable to dissolve the base polymer, i.e., the mixture of the linear diorganopolysiloxane, filler and coloring agent in one of the common hydrocarbon solvents available for that purpose, for example, inert hydrocarbon solvents such as benzene, toluene, mineral spirits, cyclohexane, xylene and other common aliphatic and aromatic solvents. When such a solution is formed of the base polymer in the solvent, it is desirable to form a solution in which the solvent forms 5 to 50% by weight of the solution and the base polymer which comprises the linear diorganopolysiloxane, the filler and the coloring pigment forms from 50 to 95% of the solution. This solution of the base polymer is then mixed with a curing agent catalyst composition as disclosed above and the solution or mixture of the two is then applied or coated on roofs or draperies and other type of objects. It should be noted that the presence of room temperature vulcanizable silicone rubber composition is especially suited for coating roofs and that it adheres very strongly and forms a cohesive bond between the roofing substrate and the silicone rubber composition. In addition, roofing granules can be applied to the top of the present two-package room temperature vulcanizable coating composition and such granules will adhere very strongly to the cured silicone rubber composition of the present case.

The amino functional silane of formula (4) is preferably used at a concentration of 0.1 to 5% and more preferably in a concentration of 0.5 to 4% by weight of the linear diorganopolysiloxane. In practice, it is preferred that one of the curing catalysts mentioned above in the discussion of additional curing catalysts, be used in addition to the amino functional silane.

There may also be present in the composition certain oxygenated solvents which will prolong the work life of the composition without retarding the final cure. The use of such solvents may prolong the work life or the pot life of the composition by at least a factor of 2, but after the silicone rubber composition has been spread out to dry the solvents evaporate quickly allowing the silicone rubber composition to cure rapidly. Oxygenated solvents that may be used are the alcohols, ether solvents, ester solvents, ketone solvents and alcohol ether solvents such as acetone, methanol, isopropanol, butyl ether, ethyl acetate, isoamylketone and methyl cellosolve.

The following examples are given for the purpose of illustrating the invention and are not intended to limit the invention in any way of manner. All parts are by weight.

EXAMPLE 1

There is prepared a base polymer solution comprising 100 parts of dimethylpolysiloxane oil which is hydroxy end-stopped and has a viscosity of 5000 centipoise at 25°C, 160 parts of ground silica filler, 2.0 parts of hydrogenated castor oil, 6.4 parts of titanium dioxide color pigments and 1.6 parts of ceramic block. The above components are mixed together. Then 80% of the above composition is mixed with 20% by weight of mineral spirits solvent. The above composition forms the base polymer solution.

The base polymer solution is mixed with the catalytic composition containing the catalyst which is a reaction product of dibutyl tin oxide and dimethylphthalate, the nitrogen functional silane and the ethyl silicate dissolved in a solvent. The composition of the catalyst mixture is shown in Table 1 below. Further, in Table 1 below, there is shown the weight percent of the catalyst composition used per 100 parts by weight of the polymer solution defined above. The resulting composition is cured for the period of time set forth in Table 1 below.

The resulting cured two-package room temperature vulcanizable silicone composition coating was then tested for adhesion and the results are indicated in Table 1 below.

TABLE I

| Ingredient | SELF-BONDING CHARACTERISTICS OF TWO-PACKAGE COMPOSITIONS TO VARIOUS SUBSTRATES | | | | | | | | |
|---|---|---|---|---|---|---|---|---|---|
| | Test No. 1 | 2 | 3 | 4 | 5 | 6 | 7 | 8 | 9 |
| Silane I* | — | 48 | — | — | — | — | — | — | — |
| Silane II** | 40 | — | 20 | — | 30 | 30 | 30 | 30 | — |
| Silane III*** | — | — | — | 20 | — | — | — | — | — |
| Ethyl Silicate-40 | 10 | 12 | 10 | 10 | 10 | 10 | 10 | 10 | 10 |
| Reaction Product of dibutyl tin oxide and dimethylphthalate | 0.12 | 0.14 | — | — | — | — | — | — | — |
| Reaction Product of dibutyl tin oxide and dimethylmaleate | — | — | 10 | 10 | 5 | 2 | 0.3 | 0.1 | 3.3 |
| Xylene | 50 | — | — | — | — | — | — | — | 13.3 |
| Mineral Spirits | — | — | 40 | 40 | — | — | — | — | — |
| Wt.% of above mixture per 100 parts of Base Polymer Solution | 2.0 | 2.0 | 2.0 | 2.0 | 1.2 | 1.2 | 1.2 | 1.2 | — |
| Property | | | | | | | | | |
| Cure Time, Min. | 30 | 30 | 5 | 5 | 7 | 7 | 45 | 120 | 60 |
| Tack Free Time, Min. | >3<18hrs. | 7 hrs. | 15 | 10 | 15 | 70 | 200 | 200 | 200 |
| Final Cure (Quality) | Good | Excellent | Excellent | Excellent | Excellent | Excellent | Excellent | Fair | Excellent |
| Qualitative Adhesion at 24 hours | | | | | | | | | |
| Plywood | Excellent | Excellent | Excellent | Excellent | Excellent | Excellent | Excellent | Excellent | Poor |
| Concrete | — | Good-/Exc. | Marginal | — | — | — | — | — | Poor |
| Stainless Steel | — | Good-/Exc. | Marginal | — | Marginal | Good | Excellent | Excellent | None |
| Alclad Aluminum | Excellent | Good-/Exc. | Marginal | Marginal | Excellent | Excellent | Excellent | Excellent | " |
| Bare Aluminum | — | — | Marginal | — | Poor | Excellent | Excellent | Excellent | " |
| Carbon Steel | Excellent | — | Marginal | — | Good | Excellent | Excellent | Excellent | " |
| Adhesion-Hydrolytic Stability at 1 mo., 120°F, 95+% Humidity | | | | | | | | | |
| Plywood | Excellent | Excellent | Excellent | Excellent | Excellent | Excellent | Excellent | Excellent | " |
| Concrete | — | Good-/Exc. | Marginal | — | — | — | — | — | " |
| Stainless Steel | — | Good-/Exc. | Marginal | — | Marginal | Good | Excellent | Excellent | " |
| Alclad Aluminum | Excellent | Good-/Exc. | Marginal | Marginal | Excellent | Excellent | Excellent | Excellent | " |
| Bare Aluminum | — | — | Marginal | — | Poor | Excellent | Excellent | Excellent | " |
| Carbon Steel | Excellent | — | Marginal | — | Good | Excellent | Excellent | Excellent | " |

*Silane I    $(CH_3O)_3Si\ CH=CH—C(CH_3)_2O—CH_2CH_2CH_2NH_2$

**Silane II    $(CH_3O)_3Si\ CH_2CH_2CH_2O—CH_2\underset{\underset{CH_3}{|}}{C}H\ CH_2NH_2$

***Silane III    $(CH_3CH_2O)_3Si—CH_2—CH_2—CH_2—NH_2$

In addition, the composition indicated in Table 1 above, after they are coated on a particular substrate the resulting laminated product is taken and placed in a humidity chamber which was partly filled with water so that the laminated product is partly immersed in water. This humidity chamber is kept at 120°F at 95+% relative humidity. After one month in this atmosphere the laminated product is taken out and again tested for adhesion. These results are also indicated in Table 1 below.

The above results indicate the excellent self-bonding characteristics of the compositions of the present case, as well as the fact that the bonds that are formed between the silicone rubber composition and the substrate are hydrolytically stable in a far more superior manner than is possible with silicone rubber compositions previously devised. It may also be pointed out that the silicone rubber composition of the present case is self-bonding with superior adhesion to all types of substrates - masonry, plastic, metal and wood, including plywood, phenolic, concrete, stainless steel, alclad aluminum, bare aluminum, carbon steel, copper, tin and other types of such substrates.

EXAMPLE 2

There is prepared a two-part silicone rubber composition. The control catalyst is dibutyl tin dilaurate and the reaction product catalyst of the present case is the reaction product of dibutyl tin oxide and dimethylphthalate. The reaction product catalyst as disclosed in accordance with the above invention is mixed with two General Electric Company RTV's of base component compositions which one case was RTV 10.1 and the other case was RTV-10.2 (RTV 10.1 and RTV-10.2 are identification numbers which we use as identifying numbers for the compositions sake of simplicity in these examples. Both are common commercially available components).

The composition of RTV-10.1 comprises 100 parts of a silanol-terminated dimethylpolysiloxane of 4,000 centipoise at 25°C, 25 parts of diatomaceous silica, 65 parts of red iron oxide, and 3 parts of ethyl orthosilicate which is partially hydrolyzed, that is, Ethyl Silicate-40, which is sold by the Union Carbide Corporation. To this RTV-10.1 there is added the indicated amount of catalyst as shown in Table 1 below and the resulting mixture is allowed to cure at room temperature wherein the work life and minutes of the composition prior to cure is indicated in Table 1 below. The track-free time of the composition as cured at room temperature is indicated in Table 1 below. The catalyst indicated in Table 1 below is also mixed in with another RTV composition of the Silicone Products Department of the General Electric Company, which is known as RTV-10.2.

The composition of RTV-10.2 comprises 100 parts of a silanol-terminated dimethylpolysiloxane of 3,000 centipoise viscosity at 25°C, 40 parts of calcium carbonate, and 3 parts of the foregoing Ethyl Silicate-40. As indicated in Table 1 below, various amounts of both dibutyl tin dilaurate which functions as the control and also various amounts of the reaction product catalyst of the present case, that is, the reaction product of dibutyl tin oxide and dimethyl phthalate, are mixed into the RTV-10.2 component and the resulting composition is allowed to cure. The work life of the composition in minutes prior to cure is indicated in Table 1 below and the tack-free time of the composition in hours is indicated in Table 1 below.

The resulting compositions are also tested in the WPSTM-E-42 Test. (This is a test devised by the Silicone Products Department of the General Electric Company to insure deep section cure). This test comprises taking the total composition mixed with the appropriate catalyst as indicated in Table 1 below and the resulting composition is poured into an aluminum dish ⅝ inch deep and ¾ inch in diameter. The dish is then cured at room temperature for 24 hours and the cured rubber is removed from the cup and the Shore A Hardness is determined at the top and bottom of the formed RTV part. This is the measure of the deep section cure. Then the resulting cured product is placed back in the cup and then allowed to cure for 24 hours at room temperature. Then the resulting part after it has been returned to the aluminum cup is taken and placed in an oven at 300°F for 1 hour. It is then cooled to room temperature and again the Shore A Hardness is measured at the top and bottom of the sample. All the compositions set forth in Table 1 below were tested in this E-42 Test, the results of which are indicated in Table 1 below, where $A_T$ and $A_B$ are the Shore A Hardness values as measured at the top and bottom of the sample after the cure for 24 hours at room temperature and where the $B_T$ and $B_B$ results are the measure of the Shore A Hardness of the sample after it had been placed in an oven at 300°F for 1 hour, the "sub T" indicating top of the sample and the "sub B" indicating the bottom of the sample. The results of this test are set forth in Table 1 below. The results clearly indicate that the samples catalyzed with the catalyst of the present case cured more evenly in deep section cure than the samples that catalyzed with the prior art catalyst, that is, dibutyl tin dilaurate. The results also of the E-42 test as set forth in Table 1 below, indicate that the samples which are catalyzed with the prior art catalyst has less hydrolytic stability and tends to degrade more, that is, Samples A, B and C have a higher hydrolytic stability and a lesser tendency to reversion than the control sample and the D sample which is also a control sample. The sample compositions are also taken and poured into an aluminum dish ⅝ inch deep and ¾ inch in diameter and after a 24-hour cure at room temperature, the resulting samples are taken and placed in a pressure cooker which is maintained at 15 lbs. per square inch gauge pressure of steam. The Shore A Hardness of these samples are determined initially before they are inserted in the pressure cooker, after 2 hours in the pressure cooker, and after 4 hours in the pressure cooker. The resulting Shore A Hardness is indicated in Table 1 below. The results of these tests indicated that the samples catalyzed with the novel reaction product of the present case are far more hydrolytically stable and have a lesser tendency to reversion than do the samples catalyzed with the prior art dibutyl tin dilaurate catalyst. Of the last three samples, that is, the B, C and D samples, these compositions are also formed and allowed to cure at room temperature after catalysis with either the dibutyl tin dilaurate or the novel reaction product of the present case. These samples are allowed to cure for 168 hours at room temperature. The samples are then formed into a 6 × 6 inches × 8 mils thickness ASTM slab for testing. The resulting samples were then tested for Shore A Hardness, tensile (psi), elongation (%), tear (lbs.) and Die B. The results of these tests are set forth in Table 1 below. As the results indicate, the resulting cured RTV product whether they are catalyzed by the prior art dibutyl tin dilaurate catalyst or catalyzed by the novel reaction product of the present case, yielded comparable results. The resulting samples are then taken after their physical properties have been determined and placed in an oven for 24 hours at 480°F. After that period of time, the samples are taken out of the oven, cooled at room temperature and the resulting physical properties are once more determined. The results of these physical properties are indicated in Table 1 below. As the results show the samples, that is, the B and C samples, which were catalyzed with the novel reaction product catalyst of the present case, as compared to the D sample which was catalyzed by the prior art, dibutyl tin dilaurate catalyst, and in which in all samples the amount of tin that was present in the cured composition was the same, the results set forth in Table 1 below indicate that at excessively high temperatures the samples catalyzed with the novel reaction product catalyst of the present case, that is, the B and C samples, retained their physical properties much better and there was less percentage drop in tensile strength in the cured samples than was the case with the D sample. The results are set forth in Table II below:

could be measured with both the prior art dibutyl tin dilaurate catalyst and the novel reaction product catalyst of the present case so as to determine the effect of the catalyst when it is mixed with a cross-linking agent and stored for a substantial period of time.

Thus, as set forth in Table III below, there were prepared two compositions, that is, the E composition which was the Control and the F composition which was the one which had in it the novel reaction product catalyst of the present case, wherein these two catalysts were utilized to prepare two different compositions, Composition E and Composition F, where in each case 10 parts of the catalyst was mixed in with 30 parts of Ethyl Silicate-40 which is a partially hydrolyzed ethyl orthosilicate sold by Union Carbide Corporation. After this mixture of catalyst and ethyl orthosilicate were mixed together, Composition E and Composition F were mixed in with the appropriate amount of RTV-10.3 which is a commercially available RTV component of a two-part RTV system. (RTV 10.3 is an identification number which is used for simplicity purposes in these examples). In such compositions, there are 1.5

TABLE II

| Component | A Parts | Control Parts | B Parts | C Parts | D Parts |
| --- | --- | --- | --- | --- | --- |
| RTV-10.1 | — | — | 100 | 100 | 100 |
| RTV-10.2 | 100 | 100 | — | — | — |
| Solubilized Bu$_2$SnO (12.9% Sn)** | 0.50* | — | 0.50* | — | — |
| Solubilized Bu$_2$SnO (24% Sn)*** | — | — | — | 0.25* | — |
| Bu$_2$Sn (Laurate)$_2$ | — | 0.50** | — | — | 0.32* |
| Work Life, minutes | 140 | 180 | 120 | 145 | 150 |
| Tack Free Time, hours | 3–4 | >8<16 | 7–8 | 7–8 | 8–9 |
| E-42 Test A$_T$ | 44 | 48 | 54 | 53 | 51 |
| A$_B$ | 35 | 34 | 52 | 51 | 44 |
| B$_T$ | 44 | 43 | 49 | 50 | 43 |
| B$_B$ | 35 | 28 | 37 | 38 | 24 |
| Pressure cooker test (14 psi steam) | | | | | |
| Shore A   Initial | 47 | 50 | 55 | 53 | 54 |
| 2 Hours | 43 | 21 | — | — | — |
| 4 Hours | — | — | 33 | 34 | 24 |
| Physical Properties (6" × 6" × 0.080" ASTM slabs) | | | | | |
| Initial (168 hours at room temperature) | | | | | |
| Shore A | | | 56 | 56 | 57 |
| Tensile, psi | | | 757 | 764 | 867 |
| Elongation, % | | | 140 | 150 | 140 |
| Tear, lbs/in Die B | | | 38 | 29 | 35 |
| 168 hours at room temperature and 24 hours at 480°F | | | | | |
| Shore A | | | 42 | 42 | 44 |
| Tensile, psi | | | 655 | 688 | 657 |
| Elongation, % | | | 200 | 200 | 190 |

*=0.06 wt. % Sn on RTV compound tested.
**=0.09 wt. % Sn on RTV compound tested.
***=Reaction product catalyst of dibutyl tin oxide and dimethyl phthalate.

From the above data, it can be seen that the solubilized dibutyl tin oxide reaction product catalyst of the present case gives approximately the same cure rate and physical properties profile as dibutyl tin dilaurate, the prior art catalyst. However, on such tests such as the E-42 test which measure the deep section cure characteristics in the A cup and the reversion resistance in the B cup test, the reaction product catalyst of the present case gave improved performance. In a further test, when the samples are exposed to a 15 psi steam environment in a pressure cooker, the Hardness test measurement can be used as an indication of relative hydrolytic stability. From the above data in Table II, it is apparent that the use of the reaction product catalyst of the present case results in less Shore A Durometer drop than the dibutyl tin dilaurate prior art catalyst. It was also decided to run a test in which the shelf-aging characteristics of a two-part RTV system weight percent of Composition E and Composition F in the total two-part RTV system which are mixed together. The resulting composition is allowed to cure and the cure time in minutes, the tack-free time in minutes and the Shore A Hardness after the composition had been allowed to cure for 24 hours at room temperature is measured. The composition of RTV-10.3 which is indicated in Table III below comprises 100 parts of a silanol-terminated dimethylpolysiloxane of 3,000 centipoise viscosity at 25°C, 250 parts of ground silica and 5 parts of iron oxide. The initial cure rate results indicate that the composition having the F component in it, has substantially the same cure time as the composition having Component E and has a much faster tack free time. The Shore A Hardness of both samples are approximately the same.

Then another test is made by taking Component E and Component F and placing them in an oven at 70°C for 4 weeks. At the end of that time, samples of both Component E and Component F are taken out and mixed with RTV-10.3, that is, sufficient amounts of these shelf aged compositions, Component E and Component F, are mixed in with RTV-10.3 such that in the total composition prepared with each component there is present 1.5 weight percent of Component E and Component F. After this, the composition is allowed to cure and the cure time, tack-free time and Shore A Hardness after cure at 24 hours at room temperature is determined. The results which are set forth in Table III below indicates that the physical properties of the final cured composition changed considerably after Component E has been shelf-aged for 4 weeks at 70°C as compared to Component F which has been shelf-aged for the same period of time. The results shown under the heading "Initial Cure" and the results shown under the "Accelerated Shelf Life" heading in Table III, indicate that there is less of a difference when Component F is utilized than is the case when Component E is utilized. The results of these tests are set forth in Table III below:

TABLE III

| Component | (Control) E Parts | F Parts |
|---|---|---|
| Ethyl Silicate-40 | 30 | 30 |
| Dibutyl tin dilaurate | 10 | — |
| Solubilized Dibutyl tin oxide reaction product with diethyl phthalate (24% Sn) | — | 10 |
| RTV-10.3 cured with 1.5 wt.% of E & F | | |
| PART A | | |
| Initial Cure | | |
| Cure Time, minutes | 30 | 25 |
| Tack Free Time, minutes | 180 | 75 |
| Shore A at 24 hours | 69 | 71 |
| PART B | | |
| Accelerated Shelf Life 4 weeks/70°C | | |
| Cure time, minutes | 10 | 13 |
| Tack Free Time, minutes | 40 | 70 |
| Shore A at 24 Hours | 73 | 75 |

The results of Table III above show that in the case when Component F is utilized, that is, the component having the novel reaction product catalyst of the present case, that when this component is utilized in a two-part RTV system there is a smaller change in cure time as well as in tack free time after the component had been shelf-aged for 4 weeks at 70°C, as compared to its cure time and its tack free time before the accelerated shelf aging than was the case with Component E. In the case of Component E as compared to Component F, there is a much more dramatic decrease in cure time and tack free time after Component E has been accelerated, shelf-aged for weeks at 70°C, as compared to its cure time and tack-free time immediately after Component E has been prepared and mixed with RTV-10.3 to form a cured two-part RTV system.

EXAMPLE 3

In this example the prior art catalyst, dibutyl-tin dilaurate, is utilized to form component A shown in Table IV below while the reaction product catalyst of the present case, that is, the reaction product of dibutyl tin oxide and dimethyl phthalate, is utilized as a catalyst to form Component B below in Table IV. In both Component A and Component B there are mixed various amounts of gamma-aminopropyltriethoxysilane which is a self-bonding additive. There is also mixed into Component A and Component B, Ethyl Silicate-40 sold by Union Carbide Corporation which is a partially hydrolyzed ethyl orthosilicate. The resulting ingredients are dissolved in mineral spirits solvent in which the self-bonding additive, the Ethyl Silicate-40 and the catalyst are soluble in. The composition of Component A and Component B of a two-part RTV system are set forth in Table IV below.

TABLE IV

| | Parts | |
|---|---|---|
| | A | B |
| γ-aminopropyltriethoxysilane | 25 | 22.5 |
| Ethyl Silicate-40 | 12.5 | 11.25 |
| Dibutyl tin dilaurate | 12.5 | — |
| Reaction product catalyst of dibutyl tin oxide and diethyl maleate (25% Sn) | — | 3.75 |
| Mineral Spirits | 50 | 62.5 |

Both of these components are mixed into Silicone Products Department, General Electric Company's RTV-10.4, which is a commercially available component for a two-part RTV system. (RTV-10.4 is an identification number that is used solely in this application). The composition of RTV-10.4 comprises 27% by weight of the total composition of silanol-terminated dimethylpolysiloxane at 8,000 centipoise viscosity at 25°C, 41% by weight of ground quartz, 12% by weight of red color masterbatch and 20% by weight of solvent which in this case is mineral spirits. To two different samples of RTV-10.4, there are added in one case 12.0 weight percent of Component A based on the weight of the total composition and 8.0 weight percent of Component B based on the weight of the total composition. The resulting compositions are then applied to plywood and Alclad aluminum panels in a film thickness comprising 20 mils thick and allowed to cure at room temperature. Cure rate tests were run on the catalyzed samples and the results are presented in Table V below.

TABLE V

| Component | A | B |
|---|---|---|
| Cure Time, minutes | 3 | 3 |
| Tack Free Time, minutes | 5 | 5 |
| Firm Cure Time, minutes | 30 | 60 |

The results of this table show that the Component B utilizing the novel catalyst reaction product of the present case has a comparable cure rate to the composition having Component A in there with the prior art dibutyl tin dilaurate catalyst. After the RTV compositions having both Component A and Component B are placed on plywood and allowed to cure for about an hour, the samples are tested for adhesion and the results are indicated in Table VI below. The samples on the Alclad aluminum are allowed to cure for 24 hours at room temperature and then the adhesion, in both samples, that is, the samples having Component A and Component B, are tested for adhesion and the results are indicated in Table VI below. After that time, the panels are then placed in a humidity chamber maintained at 95% Relative Humidity at a temperature of 120°F and the samples remained in the chamber for a period of 3 weeks after which period the samples were taken out of the humidity chamber, allowed to cool to room temperature and tested for adhesion. The results of these tests are set forth in Table VI below.

TABLE VI

| | Composition | |
|---|---|---|
| | A | B |
| Adhesion to plywood after one hour | Marginal | Excellent |
| Adhesion to Alclad aluminum at 24 hours | Fair-Good | Excellent |
| Sample Change after 4 weeks/120°F/95+% RH | Discolored, chalked and embrittled with loss of adhesion | Very slight surface discoloration. No loss of adhesion coating still has flexibility |

The results in Table VI indicate that the compositions catalyzed with the novel reaction product catalyst of the present case had much better self-bonding properties and better hydrolytic resistance than the compositions which were catalyzed with Component A which contained the prior art, dibutyl tin dilaurate.

We claim:

1. A process for producing a two-part room temperature silicone rubber composition with improved hydrolytic resistance comprising mixing,
   a. a linear, fluid organopolysiloxane containing terminal silicon-bonded hydroxy groups and having a viscosity of 500 to 10,000,000 centipoise when measured at 25°C, the organic groups of the aforesaid organopolysiloxane representing monovalent hydrocarbon radicals,
   b. a filler,
   c. from 0.1 – 15% by weight percent of an alkyl silicate selected from the class consisting of (1) a monomeric organosilicate corresponding to the general formula,

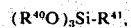

where $R^{40}$ is a radical selected from the class consisting of monovalent hydrocarbon radicals and halogenated monovalent hydrocarbon radicals and $R^{41}$ is selected from the class consisting of alkyl, haloalkyl, aryl, haloaryl, alkenyl, cycloalkyl, cyclohexyl, cyanoalkyl, alkoxy and acyloxy radicals, and (2) a liquid partial hydrolysis product of the aforementioned organosilicate monomeric compounds,
   d. from 0.1 to 5% by weight of the organopolysiloxane of a catalyst which is the reaction product of an organo tin oxide having the formula,

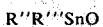

where R'' and R''' are monovalent hydrocarbon radicals with a hydrocarbon ester selected from the class consisting of esters of monocarboxylic acids, esters of dicarboxylic acids and esters of inorganic acids containing at least one oxygen atom in the said radical attached to a replaceable hydrogen atom, where there is reacted from 6 to 1 moles of the organo tin oxide per mole of the ester and the reaction is carried out at a temperature in the range of from room temperature to 250°C.

2. The process of claim 1 wherein, in said catalyst R'' and R''' are selected from alkyl and aryl radicals of up to 12 carbon atoms.

3. The process of claim 1 wherein in said catalyst said hydrocarbon ester is of an inorganic acid.

4. The process of claim 1 wherein in said catalyst, said hydrocarbon ester is of a carboxylic acid.

5. The process of claim 1 which results in a composition that is self-bonding to metals, wood and masonry wherein there is mixed into the composition prior to cure 0.1 to 10% by weight of a nitrogen-functional silane of the formula,

wherein the nitrogen functionality lies in the theta radical and R is selected from the class consisting of monovalent hydrocarbon radicals and halogenated monovalent hydrocarbon radicals, Σ is a hydrolyzable group selected from the class consisting of alkoxy, phenoxy, and dialkylamino, θ is a nitrogen functional radical which may contain in addition to the nitrogen functionality a saturated, unsaturated or aromatic hydrocarbon residue functionalized by a member selected from the class consisting of amino, cyano, oxo and ester, $a$ is a whole number that varies from 0 to 2.

* * * * *